United States Patent
Wang

(10) Patent No.: US 10,039,135 B2
(45) Date of Patent: Jul. 31, 2018

(54) COMMUNICATION ACCESS METHOD AND USER EQUIPMENT

(71) Applicant: Huawei Device (Dongguan) Co., Ltd., Dongguan (CN)

(72) Inventor: Jian Wang, Beijing (CN)

(73) Assignee: HUAWEI DEVICE (Dongguan) CO., LTD., Dongguan (CN)

(*) Notice: Subject to any disclaimer, the term of this patent is extended or adjusted under 35 U.S.C. 154(b) by 63 days.

(21) Appl. No.: 15/032,745

(22) PCT Filed: Nov. 1, 2013

(86) PCT No.: PCT/CN2013/086438
§ 371 (c)(1),
(2) Date: Apr. 28, 2016

(87) PCT Pub. No.: WO2015/062082
PCT Pub. Date: May 7, 2015

(65) Prior Publication Data
US 2016/0270123 A1    Sep. 15, 2016

(51) Int. Cl.
*H04W 74/08* (2009.01)
*H04W 72/04* (2009.01)
(Continued)

(52) U.S. Cl.
CPC ..... *H04W 74/0875* (2013.01); *H04W 72/044* (2013.01); *H04W 72/0413* (2013.01); *H04W 72/12* (2013.01); *H04W 88/02* (2013.01)

(58) Field of Classification Search
CPC ............................................... H04W 74/0875
See application file for complete search history.

(56) References Cited

U.S. PATENT DOCUMENTS 7,263,377 B1     8/2007   Wahlstrom et al.
2004/0259548 A1* 12/2004  Moon .................... H04W 36/06
                                                    455/436
(Continued)

FOREIGN PATENT DOCUMENTS

CN          101572918 A      11/2009
CN          102547871 A       7/2012
(Continued)

OTHER PUBLICATIONS

Foreign Communication From a Counterpart Application, European Application No. 13896288.1, Extended European Search Report dated Sep. 9, 2016, 7 pages.
(Continued)

*Primary Examiner* — Jason E Mattis
(74) *Attorney, Agent, or Firm* — Conley Rose, P.C.

(57) ABSTRACT

Embodiments of the present disclosure relate to a communication access method and user equipment, where the method includes sending, by a first user equipment, a first channel access request message before determining to send first information, detecting, by the first user equipment in a reserved resource, a second channel access request message sent by another user equipment, and then, sending, by the first user equipment, the first information when it is determined that the second channel access request message sent by the other user equipment is not detected in the reserved resource or a second scheduling priority carried in the second channel access request message detected in the reserved resource is lower than the first scheduling priority. Therefore, competition with another user equipment for a channel resource is avoided, and a probability of a collision occurring when information is sent on a channel is reduced.

15 Claims, 3 Drawing Sheets

(51) Int. Cl.
*H04W 72/12* (2009.01)
*H04W 88/02* (2009.01)

(56) References Cited

U.S. PATENT DOCUMENTS

| | | |
|---|---|---|
| 2011/0317636 A1 | 12/2011 | Diachina et al. |
| 2012/0275305 A1 | 11/2012 | Lin |
| 2014/0003336 A1* | 1/2014 | Padden ................ H04W 72/10 370/328 |
| 2014/0324974 A1* | 10/2014 | Park ..................... H04W 72/02 709/204 |
| 2016/0113050 A1* | 4/2016 | Li ..................... H04W 52/0209 370/329 |

FOREIGN PATENT DOCUMENTS

| | | |
|---|---|---|
| CN | 102958066 A | 3/2013 |
| WO | 9711566 A2 | 3/1997 |
| WO | 2013107004 A1 | 7/2013 |

OTHER PUBLICATIONS

Foreign Communication From a Counterpart Application, PCT Application No. PCT/CN2013/086438, English Translation of International Search Report dated Jul. 30, 2014, 2 pages.
Foreign Communication From a Counterpart Application, PCT Application No. PCT/CN2013/086438, English Translation of Written Opinion dated Jul. 30, 2014, 6 pages.

* cited by examiner

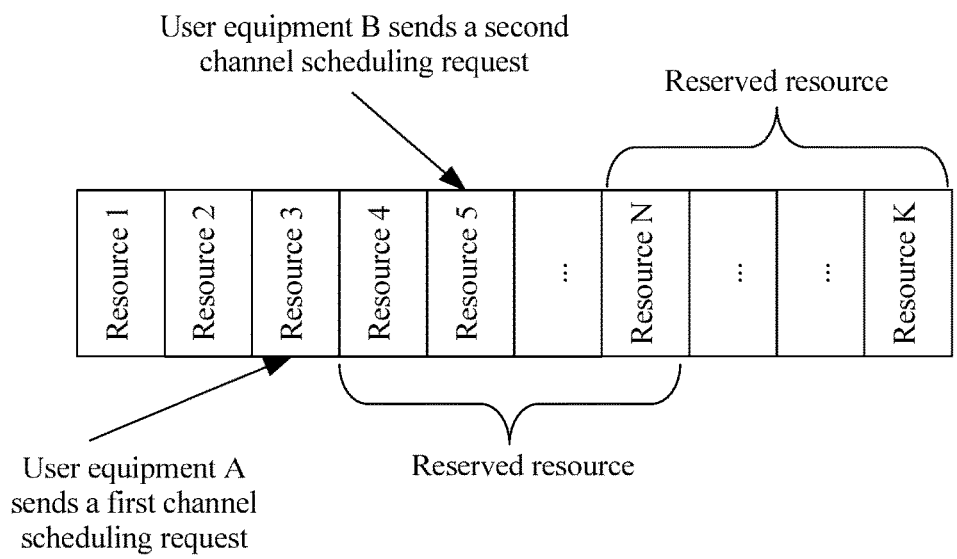

FIG. 2B

| Sequence 1 | → Scheduling priority 1, corresponding to a reserved sequence 1-3 |
| Sequence 2 | → Scheduling priority 1, corresponding to a reserved sequence 1-N |
| Sequence 3 | → Scheduling priority 2, corresponding to a reserved sequence 1-3 |
| ... | → Scheduling priority 2, corresponding to a reserved sequence 1-N |
| Sequence N | → Scheduling priority 3, corresponding to a reserved sequence 1-3 |
| Sequence N+1 | → Scheduling priority 3, corresponding to a reserved sequence 1-N |

FIG. 3

COMMUNICATION ACCESS METHOD AND USER EQUIPMENT

CROSS-REFERENCE TO RELATED APPLICATION

This application is a U.S. National Stage of International Application No. PCT/CN2013/086438, filed on Nov. 1, 2013, which is hereby incorporated by reference in its entirety.

TECHNICAL FIELD

Embodiments of the present disclosure relate to the field of communications technologies, and in particular, to a communication access method and user equipment.

BACKGROUND

With development of science and technology, communications technologies also develop rapidly.

In an existing communications system, when user equipment is ready for occupying a channel to send information, first the user equipment needs to send a scheduling request (SR), and then after a central control node receives the scheduling request sent by the user equipment, the central control node allocates a resource to the user equipment, and sends a resource indication to the user equipment using signaling. Then the user equipment uses a resource allocated by a network device for data transmission.

However, in device-to-device (D2D) communication, because no central control node allocates, to user equipment that needs to send information, a resource for sending the information, there exists a case in which different plurality of user equipment acquire a resource in a competitive access manner and consequently a collision of the resource may occur during competitive access.

SUMMARY

The present disclosure provides a communication access method and user equipment, which are used to reduce a collision of a resource occurring when the user equipment competes for access.

According to a first aspect, an embodiment of the present disclosure provides a communication access method, including sending, by first user equipment, a first channel access request message before determining to send first information, where the first channel access request message includes a first scheduling priority and an indication that the first user equipment is ready for sending the first information, detecting, by the first user equipment in a reserved resource, a second channel access request message sent by another user equipment, and sending, by the first user equipment, the first information when it is determined that the second channel access request message sent by the other user equipment is not detected in the reserved resource or a second scheduling priority carried in the second channel access request message detected in the reserved resource is lower than the first scheduling priority.

In a first possible implementation manner, the method further includes canceling, by the first user equipment, sending the first information when it is determined that the second scheduling priority carried in the second access request message detected in the reserved resource is higher than or equal to the first scheduling priority.

With reference to the first aspect or the first possible implementation manner of the first aspect, in a second possible implementation manner, the reserved resource includes at least one or any combination of a time resource, a code word resource, or a frequency resource.

With reference to the first aspect, or either one of the first and second possible implementation manners of first aspect, in a third possible implementation manner, information about the reserved resource is carried in the first channel access request message, or information about the reserved resource is preconfigured information, or information about the reserved resource is carried in a message sent by a network node, where the network node is a network element of a network in which the first user equipment is currently located.

With reference to the first aspect, or any one of the first to third possible implementation manners of the first aspect, in a fourth possible implementation manner, before the sending, by first user equipment, a first channel access request message before determining to send first information, the method further includes receiving, by the first user equipment, a third channel access request message sent by another user equipment, and sending, by the first user equipment, the first channel access request message when it is determined that a third scheduling priority carried in the third channel access request message is lower than the first scheduling priority.

According to a second aspect, an embodiment of the present disclosure provides user equipment, including a sending module configured to send a first channel access request message before determining to send first information, where the first channel access request message includes a first scheduling priority and an indication that the first user equipment is ready for sending the first information, and a detection module configured to detect, in a reserved resource, a second channel access request message sent by another user equipment, where the sending module is further configured to send the first information when the second channel access request message sent by the other user equipment is not detected by the detection module or a second scheduling priority carried in the second channel access request message detected by the detection module in the reserved resource is lower than the first scheduling priority.

In a first possible implementation manner, the sending module is further configured to cancel sending the first information when it is determined that the second scheduling priority carried in the second access request message detected by the detection module in the reserved resource is higher than or equal to the first scheduling priority.

With reference to the second aspect or the first possible implementation manner of the second aspect, in a second possible implementation manner, the reserved resource includes at least one or any combination of a time resource, a code word resource, or a frequency resource.

With reference to the second aspect, or either one of the first and second possible implementation manners of the second aspect, in a third possible implementation manner, information about the reserved resource is carried in the first channel access request message, or information about the reserved resource is preconfigured information, or information about the reserved resource is carried in a message sent by a network node, where the network node is a network element of a network in which the first user equipment is currently located.

With reference to the second aspect, or any one of the first to third possible implementation manners of the second aspect, in a fourth possible implementation manner, the user equipment further includes a receiving module, where the receiving module is configured to receive a third channel access request message sent by another user equipment, and the sending module is further configured to send the first channel access request message when it is determined that a third scheduling priority carried in the third channel access request message is lower than the first scheduling priority.

According to the communication access method and the user equipment provided in the aspects of the present disclosure, first user equipment sends a first channel access request message before determining to send first information. Then the first user equipment detects, in a reserved resource, a second channel access request message sent by another user equipment, and then, the first user equipment sends the first information when it is determined that the second channel access request message sent by the other user equipment is not detected in the reserved resource or a second scheduling priority carried in the second channel access request message detected in the reserved resource is lower than the first scheduling priority. Therefore, competition with another user equipment for a channel resource is avoided, and a probability of a collision occurring when information is sent on the channel is reduced.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

FIG. 2B is a schematic diagram of a communication access method according to another embodiment of the present disclosure;

FIG. 3 is a schematic diagram of a communication access method according to still another embodiment of the present disclosure;

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The sequence numbers of the following embodiments of the present disclosure are merely for illustrative purposes, and are not intended to indicate advantages and disadvantages of the embodiments.

The embodiments are applicable to a scenario in which first user equipment is ready for sending first information on the channel when the first user equipment performs D2D communication with nearby user equipment.

Figure 1:
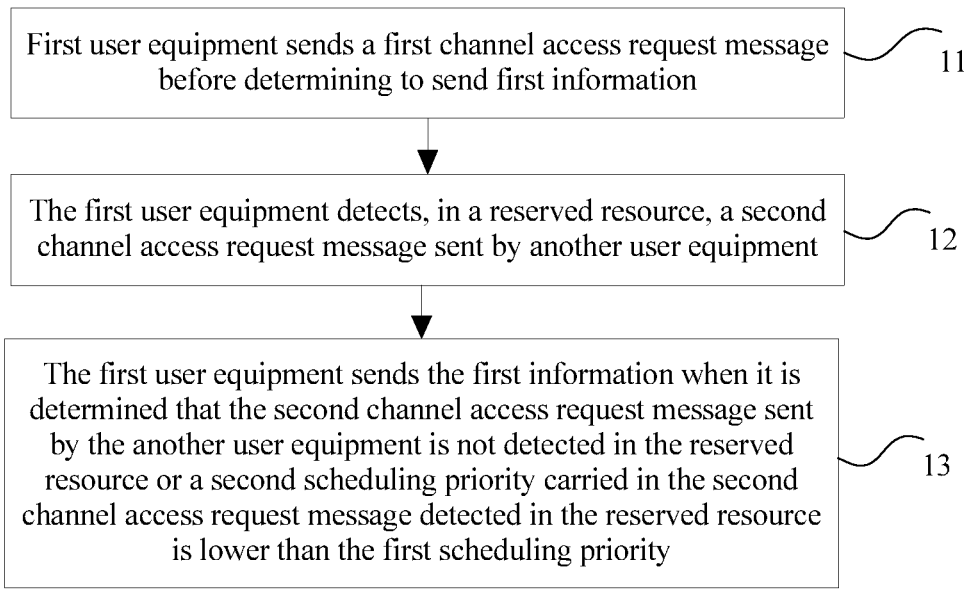
FIG. 1 is a flowchart of a test control method according to an embodiment of the present disclosure.

FIG. 1 is a flowchart of a communication access method according to an embodiment of the present disclosure. As shown in FIG. 1, the communication access method provided in this embodiment includes the following steps.

Step 11: First user equipment sends a first channel access request message before determining to send first information.

In this embodiment, the first channel access request message includes a first scheduling priority and an indication that the first user equipment is ready for sending the first information.

Step 12: The first user equipment detects, in a reserved resource, a second channel access request message sent by another user equipment.

It should be noted that, the reserved resource includes at least one or any combination of a time resource, a code word resource, or a frequency resource, where information about the reserved resource may be carried in the first channel access request message, or information about the reserved resource is preconfigured information, or information about the reserved resource is carried in a message sent by a network node, where the network node is a network element of a network in which the first user equipment is currently located.

Step 13: The first user equipment sends the first information when it is determined that the second channel access request message sent by the other user equipment is not detected in the reserved resource or a second scheduling priority carried in the second channel access request message detected in the reserved resource is lower than the first scheduling priority.

In this embodiment, an applicable scenario in which the first user equipment sends the first information includes at least two of the following types.

Applicable scenario 1: The first user equipment determines that the second channel access request message sent by the other user equipment is not detected in the reserved resource, that is, no other user equipment is to compete for the reserved resource, where the reserved resource is a resource used by the first user equipment that is ready for sending the first information.

Applicable scenario 2: The second scheduling priority carried in the second channel access request message detected in the reserved resource is lower than the first scheduling priority.

On a basis of the foregoing embodiment, information about the first scheduling priority may include at least one or any combination of a priority of the first user equipment, a service type of the first information, or a priority of the first information. Information about the second scheduling priority may include at least one or any combination of a priority of second user equipment, a service type of second information, or a priority of second information.

Furthermore, implementation manners in which the first user equipment determines that the second scheduling priority carried in the second channel access request message is lower than the first scheduling priority include at least the following six types.

Implementation manner 1: The first user equipment determines that the priority of the second user equipment is lower than the priority of the first user equipment.

Implementation manner 2: The first user equipment determines that a priority of the service type of the second information is lower than a priority of the service type of the first information.

Implementation manner 3: The first user equipment determines that the priority of the second information is lower than the priority of the first information.

Implementation manner 4: After it is determined that the priority of the second user equipment is the same as the priority of the first user equipment, the first user equipment determines that a priority of the service type of the second information is lower than a priority of the service type of the first information.

Implementation manner 5: After it is determined that the priority of the second user equipment is the same as the priority of the first user equipment, the first user equipment determines that the priority of the second information is lower than the priority of the first information.

Implementation manner 6: After it is determined that the priority of the second user equipment is the same as the priority of the first user equipment, and that a priority of the service type of the first information is the same as a priority of the service type of the second information, the first user equipment determines that the priority of the second information is lower than the priority of the first information.

It should be noted that, specific implementation manners of the information about the first scheduling priority and information about a first resource include the following three types.

Implementation manner 1: The information about the first scheduling priority and the information about the first resource are both in a form of a message, that is, the information about the first scheduling priority is represented by bits indicating the information about the first scheduling priority, and the information about the first resource is represented by bits indicating the information about the first resource.

Implementation manner 2: The information about the first scheduling priority and the information about the first resource are both in a form of a sequence, that is, the information about the first scheduling priority is represented by a sequence indicating the information about the first scheduling priority, and the information about the first resource is represented by a sequence indicating the information about the first resource.

Implementation manner 3: The information about the first scheduling priority is in a form of a sequence, and the information about the first resource is in a form of a sequence, that is, the information about the first scheduling priority is represented by a sequence indicating the information about the first scheduling priority, and the information about the first resource is represented by a sequence indicating the information about the first resource. The first resource is, for example, a time resource or a frequency resource.

In this embodiment, first user equipment sends a first channel access request message before determining to send first information. Then the first user equipment detects, in a reserved resource, a second channel access request message sent by another user equipment, and then, the first user equipment sends the first information when it is determined that the second channel access request message sent by the other user equipment is not detected in the reserved resource or a second scheduling priority carried in the second channel access request message detected in the reserved resource is lower than the first scheduling priority. Therefore, competition with another user equipment for a channel resource is avoided, and a probability of a collision occurring when information is sent on the channel is reduced.

Further, on a basis of the foregoing embodiment, may further include canceling, by the first user equipment, sending the first information when it is determined that the second scheduling priority carried in the second access request message detected in the reserved resource is higher than or equal to the first scheduling priority.

Implementation manners of the canceling, by the first user equipment, sending the first information when it is determined that the second scheduling priority carried in the second access request message detected in the reserved resource is higher than or equal to the first scheduling priority include the following six types.

Implementation manner 1: The first user equipment determines that the priority of the second user equipment is higher than or equal to the priority of the first user equipment.

Implementation manner 2: The first user equipment determines that the priority of the service type of the second information is higher than or equal to the priority of the service type of the first information.

Implementation manner 3: The first user equipment determines that the priority of the second information is higher than or equal to the priority of the first information.

Implementation manner 4: After it is determined that the priority of the second user equipment is the same as the priority of the first user equipment, the first user equipment determines that the priority of the service type of the second information is higher than or equal to the priority of the service type of the first information.

Implementation manner 5: After it is determined that the priority of the second user equipment is the same as the priority of the first user equipment, the first user equipment determines that the priority of the second information is higher than or equal to the priority of the first information.

Implementation manner 6: After it is determined that the priority of the second user equipment is the same as the priority of the first user equipment, and that the priority of the service type of the first information is the same as the priority of the service type of the second information, the first user equipment determines that the priority of the second information is higher than or equal to the priority of the first information.

Further, on a basis of the foregoing embodiment, before step 11, may further include receiving, by the first user equipment, a third channel access request message sent by another user equipment.

In this embodiment, the third channel access request message may include a third scheduling priority and an indication that third user equipment is ready for sending third information.

The first user equipment sends the first channel access request message when it is determined that the third scheduling priority carried in the third channel access request message is lower than the first scheduling priority.

Information about the third scheduling priority may include at least one or any combination of a priority of third user equipment, a service type of the third information, or a priority of the third information.

Specific implementation manners in which the first user equipment determines that the third scheduling priority carried in the third channel access request message is lower than the first scheduling priority include the following implementation manners.

Implementation manner 1: The first user equipment determines that the priority of the third user equipment is lower than the priority of the first user equipment.

Implementation manner 2: The first user equipment determines that a priority of the service type of the third information is lower than the priority of the service type of the first information.

Implementation manner 3: The first user equipment determines that the priority of the third information is lower than the priority of the first information.

Implementation manner 4: After it is determined that the priority of the third user equipment is the same as the priority of the first user equipment, the first user equipment determines that a priority of the service type of the third information is lower than the priority of the service type of the first information.

Implementation manner 5: After it is determined that the priority of the third user equipment is the same as the priority of the first user equipment, the first user equipment determines that the priority of the third information is lower than the priority of the first information.

Implementation manner 6: After it is determined that the priority of the third user equipment is the same as the priority of the first user equipment, and that a priority of the service type of the third information is the same as the priority of the service type of the first information, the first user equipment determines that the priority of the third information is lower than the priority of the first information.

In this embodiment, first user equipment sends a first channel access request message when it is determined that a third scheduling priority carried in a third channel access request message is lower than a first scheduling priority in order to avoid competition with user equipment whose first scheduling priority is high for a channel resource.

Figure 2A:
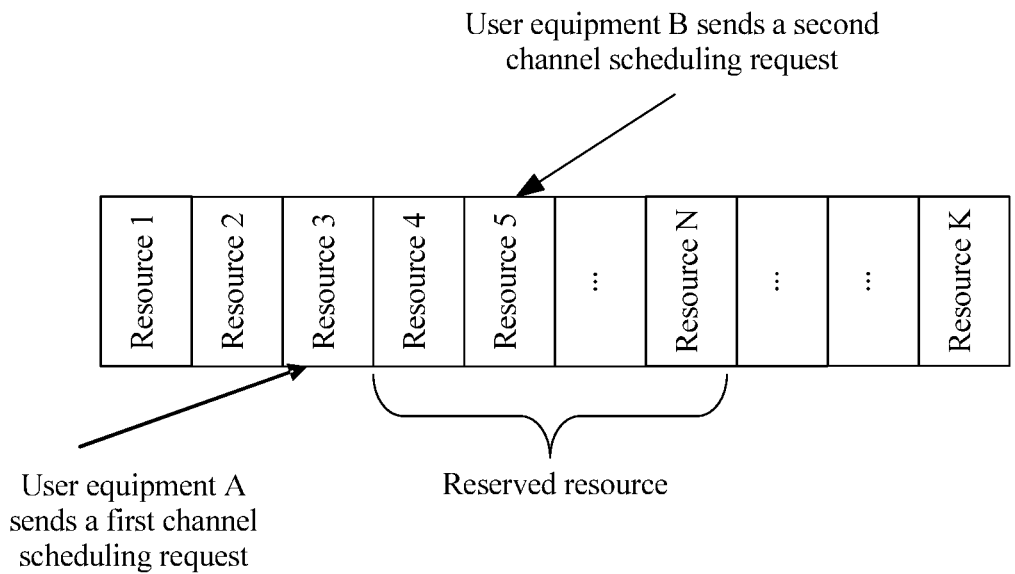
FIG. 2A is a schematic diagram of a communication access method according to an embodiment of the present disclosure.

FIG. 2A is a schematic diagram of a communication access method according to an embodiment of the present disclosure. FIG. 2B is a schematic diagram of a communication access method according to another embodiment of the present disclosure. As shown in FIG. 2A and FIG. 2B, a reserved resource in this embodiment is a time resource, and this embodiment further includes sending, by first user equipment, for example, user equipment A, a first channel access request message at a first moment, for example, a time resource 3, before determining to send first information, where the first channel access request message includes a first scheduling priority and the reserved resource, and the reserved resource is a time resource, for example, a time resource 4 to a time resource N. Then, the first user equipment detects, in the reserved resource, a second channel access request message sent by another user equipment, that is, the other user equipment, for example, user equipment B, compares a scheduling priority of the first channel access request of the user equipment A with a scheduling priority of a second channel access request of the user equipment B. If the user equipment B finds that the scheduling priority of the second channel access request of the user equipment B is relatively low, the user equipment B does not perform a subsequent action. If the user equipment B finds that the scheduling priority of the second channel access request of the user equipment B is relatively high, the user equipment B selects a time resource, for example, a time resource 5, from a time resource reserved by the user equipment A to send the second channel access request message of the user equipment B. Between the time resource 3 and the time resource 5, the user equipment B further continuously monitors each time resource. If the user equipment B finds a channel access request sent by another user equipment, the user equipment B compares scheduling priorities of the access requests. If the scheduling priority is higher than or equal to the user equipment B, the user equipment B does not send the second channel access request message in the time resource 5, as shown in FIG. 2A, where the second channel access request message includes the first scheduling priority. Alternatively, if no access request message between the time resource 3 and the time resource 5 is found, or a scheduling priority of a detected access request message is lower than that of the user equipment B, the user equipment B sends the access request message in the time resource 5. It should be noted that, the second channel access request message sent by the user equipment may also carry a reserved resource. As shown in FIG. 2B, the second channel access request message includes the first scheduling priority and a reserved resource, where the reserved resource is a time resource N+1 to a time resource K. At the same time, after sending the first channel access request message in the time resource 3, the user equipment A also continues to detect a reserved time resource. If the channel access request sent by the other user equipment is not found, the user equipment A starts to send, after the reserved time resource, service information, that is, the first information.

It should be noted that, the reserved resource may also be a frequency resource, where a specific implementation manner is similar to an implementation principle when the reserved resource is a time resource, and details are not described herein again.

FIG. 3 is a schematic diagram of a communication access method according to still another embodiment of the present disclosure. As shown in FIG. 3, a channel access request in this embodiment is in a form of a sequence, and each sequence number corresponds to information about a scheduling priority and information about a reserved resource, where the reserved resource is a sequence resource.

This embodiment further includes sending, by first user equipment, for example, user equipment A, a first channel access request message using a sequence, for example, a sequence resource 3, where the first channel access request message includes information about a first scheduling priority of the user equipment A and information about a reserved resource. User equipment around the user equipment A detects the first channel access request message sent by the user equipment A. In this case, another user equipment that also has a channel access request, for example, user equipment B compares a scheduling priority of a first channel access request of the user equipment A with a scheduling priority of a channel access request of the user equipment B. If the user equipment B finds that the scheduling priority of the channel access request of the user equipment B is relatively low, the user equipment B does not perform a subsequent action. If the user equipment B finds that the scheduling priority of the channel access request of the user equipment B is relatively high, the user equipment B selects a sequence resource, for example, a frequency resource N, from a sequence resource reserved by the user equipment A to send the channel access request message of the user equipment B. When the user equipment B selects a sequence resource to send the channel access request of the user equipment B, the user equipment B also monitors the reserved resource of the user equipment A. If the user equipment B finds a channel access request sent by another user equipment, the user equipment B compares scheduling priorities of the channel access requests. If the scheduling priority of the channel access request sent by the other user equipment is higher, the user equipment B does not send second information. If no channel access request message is found by the user equipment B in a reserved frequency resource, or a scheduling priority of a detected channel access request message is lower than that of the channel access request message of the user equipment B, the user equipment B sends the channel access request of the user equipment B, that is, the second channel access request. At the same time, after sending an access request message in the sequence resource 3, the user equipment A also continues to detect a reserved resource. If an access request sent by the other user equipment is not found, the user equipment A sends service information, that is, first information.

Figure 4:
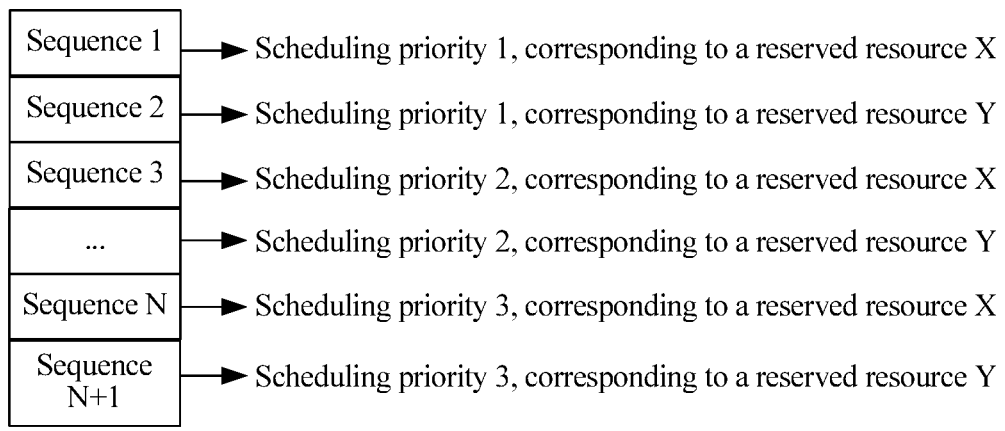
FIG. 4 is a schematic diagram of a communication access method according to yet another embodiment of the present disclosure.

FIG. 4 is a schematic diagram of a communication access method according to yet another embodiment of the present disclosure. As shown in FIG. 4, a channel access request in this embodiment is in a form of a sequence, and each sequence number corresponds to information about a scheduling priority and information about a reserved resource, where the reserved resource refers to a time resource, or a frequency resource. This embodiment further includes sending, by first user equipment, for example, user equipment A, a first channel access request message using a sequence, for example, a sequence resource 3, where the first channel access request message includes information about a first scheduling priority of the user equipment A and information about a reserved code word resource. User equipment around the user equipment A detects the first channel access request message sent by the user equipment A. In this case, another user equipment that also sends a channel access request, for example, user equipment B compares the first scheduling priority of the first channel access request of the user equipment A with a scheduling priority of an access request of the user equipment B. If the user equipment B finds that the scheduling priority of the access request of the user equipment B is relatively low, the user equipment B does not perform a subsequent action. If the user equipment B finds that the scheduling priority of the access request of the user equipment B is relatively high, the user equipment B selects a time resource, for example, a time resource N from a time resource reserved by the user equipment A, and plans to send an access request sequence of the user equipment B in the time resource. Before the time resource N, the user equipment B further continuously monitors another reserved time resource. If the user equipment B finds a channel access request sent by another user equipment, the user equipment B compares scheduling priorities of the channel access requests. If the scheduling priority of the channel access request sent by the other user equipment is higher than or equal to that of the channel access request sent by the user equipment B, the user equipment B does not send an access request message in the time resource N. If no access request message is found before the time resource N, or a scheduling priority of a detected access request message is lower than that of the user equipment B, the user equipment B sends the access request sequence in the time resource N. At the same time, after sending a channel access request message using the sequence resource 3, the user equipment A also continues to detect a reserved time resource. If the channel access request sent by the other user equipment is not found by the user equipment A, the user equipment A starts to send, after the reserved time resource, service information, that is, second information.

Figure 5:
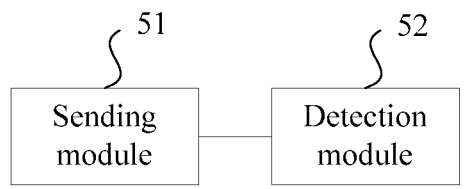
FIG. 5 is a schematic structural diagram of user equipment according to an embodiment of the present disclosure.

FIG. 5 is a schematic structural diagram of user equipment according to an embodiment of the present disclosure. As shown in FIG. 5, the user equipment includes a sending module 51 and a detection module 52.

The sending module 51 is configured to send a first channel access request message before determining to send first information, where the first channel access request message includes a first scheduling priority and an indication that the first user equipment is ready for sending the first information.

The detection module 52 is configured to detect, in a reserved resource, a second channel access request message sent by another user equipment.

The sending module 51 is further configured to send the first information when the second channel access request message sent by the other user equipment is not detected by the detection module 52 or a second scheduling priority carried in the second channel access request message detected by the detection module 52 in the reserved resource is lower than the first scheduling priority.

In this embodiment, first user equipment sends a first channel access request message before determining to send first information. Then the first user equipment detects, in a reserved resource, a second channel access request message sent by another user equipment, and then, the first user equipment sends the first information when it is determined that the second channel access request message sent by the other user equipment is not detected in the reserved resource or a second scheduling priority carried in the second channel access request message detected in the reserved resource is lower than the first scheduling priority. Therefore, competition with another user equipment for a channel resource is avoided, and a probability of a collision occurring when information is sent on the channel is reduced.

On a basis of the foregoing embodiment, the detection module 52 is further configured to cancel sending the first information when it is determined that the second scheduling priority carried in the second access request message detected in the reserved resource is higher than or equal to the first scheduling priority.

Further, on a basis of the foregoing embodiment, the reserved resource includes at least one or any combination of a time resource, a code word resource, or a frequency resource.

Information about the reserved resource is carried in the first channel access request message, or information about the reserved resource is preconfigured information, or information about the reserved resource is carried in a message sent by a network node, where the network node is a network element of a network in which the first user equipment is currently located.

Figure 6:
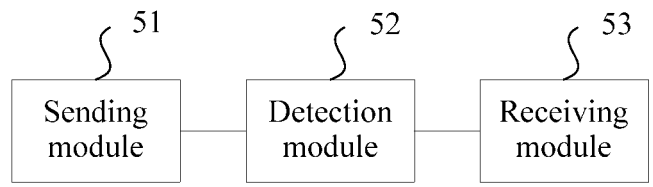
FIG. 6 is a schematic structural diagram of user equipment according to another embodiment of the present disclosure.

FIG. 6 is a schematic structural diagram of user equipment according to another embodiment of the present disclosure. As shown in FIG. 6, the user equipment may further include a receiving module 53, where the receiving module 53 is configured to receive a third channel access request message sent by another user equipment, and the sending module 51 is further configured to send the first channel access request message when it is determined that a third scheduling priority carried in the third channel access request message is lower than the first scheduling priority.

Figure 7:
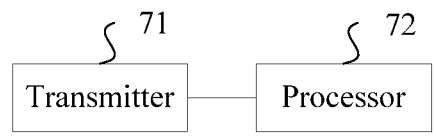
FIG. 7 is a schematic structural diagram of user equipment according to still another embodiment of the present disclosure.

FIG. 7 is a schematic structural diagram of user equipment according to still another embodiment of the present disclosure. As shown in FIG. 7, the user equipment includes a transmitter 71 and a processor 72.

The transmitter 71 is configured to send a first channel access request message before determining to send first information, where the first channel access request message includes a first scheduling priority and an indication that the first user equipment is ready for sending the first information.

The processor 72 is configured to detect, in a reserved resource, a second channel access request message sent by another user equipment.

The transmitter 71 is further configured to send the first information when the second channel access request message sent by the other user equipment is not detected by the processor 72 or a second scheduling priority carried in the second channel access request message detected in the reserved resource is lower than the first scheduling priority.

In this embodiment, first user equipment sends a first channel access request message before determining to send first information. Then the first user equipment detects, in a reserved resource, a second channel access request message sent by another user equipment, and then, the first user equipment sends the first information when it is determined that the second channel access request message sent by the other user equipment is not detected in the reserved resource or a second scheduling priority carried in the second channel access request message detected in the reserved resource is lower than the first scheduling priority. Therefore, competition with another user equipment for a channel resource is avoided, and a probability of a collision occurring when information is sent on the channel is reduced.

On a basis of the foregoing embodiment, the processor 72 is further configured to cancel sending the first information when it is determined that the second scheduling priority carried in the second access request message detected in the reserved resource is higher than or equal to the first scheduling priority.

Further, on a basis of the foregoing embodiment, the reserved resource includes at least one or any combination of a time resource, a code word resource, or a frequency resource.

Information about the reserved resource is carried in the first channel access request message, or information about the reserved resource is preconfigured information, or information about the reserved resource is carried in a message sent by a network node, where the network node is a network element of a network in which the first user equipment is currently located.

Figure 8:
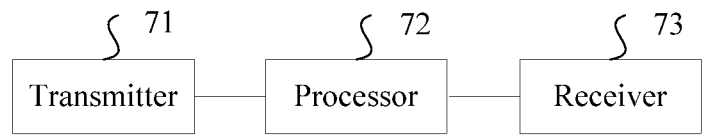
FIG. 8 is a schematic structural diagram of user equipment according to yet another embodiment of the present disclosure.

FIG. 8 is a schematic structural diagram of user equipment according to yet another embodiment of the present disclosure. As shown in FIG. 8, the user equipment may further include a receiver 73.

The receiver 73 is configured to receive a third channel access request message sent by another user equipment.

The transmitter 71 is further configured to send the first channel access request message when it is determined that a third scheduling priority carried in the third channel access request message is lower than the first scheduling priority.

A person skilled in the art may understand that the accompanying drawing is merely a schematic diagram of one embodiment, and modules or processes in the accompanying drawing are not necessarily required for implementing the present disclosure.

A person skilled in the art may understand that the modules in the user equipment provided in the embodiments may be arranged in the user equipment in the embodiments in a distributed manner according to the description of the embodiments, or may be arranged in one or more user equipment that are different from those described in the embodiments. The modules in the foregoing embodiments may be combined into one module, or split into a plurality of submodules.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure another than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A communication access method, comprising:
sending, by a first user equipment, a first channel access request message before determining to send first information, wherein the first channel access request message corresponds to the first user equipment and comprises information indicating a first scheduling priority and an indication that the first user equipment is ready for sending the first information, wherein the information indicating the first scheduling priority includes a plurality of bits or a sequence of numbers, and wherein the information indicating the first scheduling priority includes a first priority of the first user equipment and a first service type of the first information;
determining, by the first user equipment, whether the first user equipment detects, in a reserved resource, a second channel access request message corresponding to a second user equipment, wherein the second channel access request message is a request for the second user equipment to send second information, and wherein the second channel access request message includes a second scheduling priority that includes information indicating a second priority of the second user equipment and a second service type of the second information;
determining that the first priority of the first user equipment is the same as the second priority of the second user equipment;
subsequent to determining that the first priority of the first user equipment is the same as the second priority of the second user equipment, determining that a priority of the first service type is equal to a priority of the second service type; and
canceling, by the first user equipment, sending the first information when the priority of the first service type is equal to the priority of the second service type.

2. The method according to claim 1, wherein the reserved resource comprises at least one or any combination of a time resource, a code word resource, and a frequency resource.

3. The method according to claim 1, wherein the reserved resource comprises at least one or any combination of a time resource, a code word resource, and a frequency resource.

4. The method according to claim 1, wherein information about the reserved resource is carried in the first channel access request message, wherein the information about the reserved resource is preconfigured information, or wherein the information about the reserved resource is carried in a message sent by a network node.

5. The method according to claim 2, wherein the information about the reserved resource is carried in a message sent by a network node, and wherein the network node is a network element of a network in which the first user equipment is currently located.

6. The method according to claim 3, wherein information about the reserved resource is carried in the first channel access request message.

7. The method according to claim 3, wherein information about the reserved resource is preconfigured information.

8. The method according to claim 3, wherein information about the reserved resource is carried in a message sent by a network node, and wherein the network node is a network element of a network in which the first user equipment is currently located.

9. The method of claim 1, wherein the information indicating the first scheduling priority includes a service type.

10. A first device, comprising:
a transmitter; and
a processor coupled to the transmitter,
wherein the transmitter is configured to send a first channel access request message before determining to send first information, wherein the first channel access request message corresponds to the first device and comprises information indicating a first scheduling priority and an indication that the first device is ready for sending the first information, wherein the information indicating the first scheduling priority includes a plurality of bits or a sequence of numbers, and wherein the information indicating the first scheduling priority includes a first priority of the first device and a first service type of the first information,
wherein the processor is configured to determine whether the processor detects, in a reserved resource, a second channel access request message corresponding to a second device,
wherein the second channel access request message is a request for the second device to send second information, wherein the transmitter is further configured to send the first information when:
the processor does not detect, in the reserved resource, the second channel access request message corresponding to the second device; or
the processor detects, in the reserved resource, the second channel access request message corresponding to the second device and a second scheduling priority carried in the second channel access request message is lower than the first scheduling priority, wherein the second scheduling priority includes information indicating a second priority of the second device and a second service type of the second information, and
wherein the processor is further configured to:
determine that the first priority of the first device is the same as the second priority of the second device;
subsequent to determining that the first priority of the first device is the same as the second priority of the second device, determine that a priority of the first service type is equal to a priority of the second service type; and
cancel, by the first device, sending the first information when the priority of the first service type is equal to the priority of the second service type.

11. The first device according to claim 10, wherein the reserved resource comprises at least one or any combination of a time resource, a code word resource, or a frequency resource.

12. The first device according to claim 10, wherein information about the reserved resource is carried in the first channel access request message.

13. The first device according to claim 10, wherein information about the reserved resource is preconfigured information.

14. The first device according to claim 10, wherein information about the reserved resource is carried in a message sent by a network node, and wherein the network node is a network element of a network in which the first device is currently located.

15. The method of claim 9, wherein the information indicating the first scheduling priority includes a priority of the first information.

* * * * *